(12) United States Patent
Stuber (10) Patent No.: US 10,328,883 B2
(45) Date of Patent: Jun. 25, 2019

(54) ROLL OVER PROTECTION SYSTEM RATTLE REDUCTION (71) Applicant: Deere & Company, Moline, IL (US)

(72) Inventor: David L. Stuber, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/477,701

(22) Filed: Apr. 3, 2017

(65) Prior Publication Data
US 2018/0281722 A1 Oct. 4, 2018

(51) Int. Cl.
E02F 9/16 (2006.01)
B60R 21/00 (2006.01)
B60R 21/13 (2006.01)

(52) U.S. Cl.
CPC ............ B60R 21/131 (2013.01); B60R 21/13 (2013.01); E02F 9/163 (2013.01); B60R 2021/0081 (2013.01)

(58) Field of Classification Search
CPC .................. B60R 21/131; B60R 21/13; B60R 2021/0081; E02F 9/163
See application file for complete search history.

(56) References Cited

U.S. PATENT DOCUMENTS 4,077,655 A * 3/1978 Skahill .................. B60R 21/131 280/756
4,084,423 A * 4/1978 Schlecht ................. B21C 23/14 72/256
4,949,991 A 8/1990 Ludwig
5,503,430 A 4/1996 Miki et al.
5,779,272 A 7/1998 Panek et al.
5,839,758 A 11/1998 Finch et al.
7,568,732 B2 8/2009 Schlup, Jr.
7,971,905 B2 7/2011 McCord et al.

FOREIGN PATENT DOCUMENTS

JP H11321503 A 11/1999

OTHER PUBLICATIONS

German Patent Office Examination Report for Application No. 10 2018 204 832.0 dated Nov. 21, 2018 (11 pages, statement of relevance included).

* cited by examiner

Primary Examiner — Paul N Dickson
Assistant Examiner — Joselynn Y Sliteris
(74) Attorney, Agent, or Firm — Michael Best & Friedrich LLP (57) ABSTRACT A roll over protection system for a vehicle having a first upright portion with a first end and a second end defining a first aperture, a second upright portion having a first end and a second end defining a second aperture, a third upright portion having a first end defining a first borehole and connected to first upright portion and a second end having a second borehole and connected to the second portion, a first pin and a first bushing are positioned in the first aperture and the first borehole, a second pin and a second bushing are positioned in the second aperture and the second borehole, the first and second bushings having first inner diameters that are greater than second inner diameters, the first and second pins having diameters that are greater than the second inner diameters and less than or equal to the first inner diameters.

19 Claims, 7 Drawing Sheets

ROLL OVER PROTECTION SYSTEM RATTLE REDUCTION

BACKGROUND

The present application relates to roll over protection systems for vehicles. Roll over protections systems are designed to protect a vehicle operator in the event that the vehicle tips or rolls over. However, the height of the roll over protection system may be greater than the height of a barn door or the height of branches around which the vehicle moves. Sometimes, it is desirable for an operator to lower the roll over protection system. However, in the past, a substantial amount of noise was created when the components of the roll over protection system rattled during vehicle operation. Various attempts have been made to address this problem. However, the present application provides a unique solution to the problem of rattling in roll over protection systems.

SUMMARY

In some embodiments, the disclosure provides a roll over protection system for a vehicle having a frame, a left side, a right side, a front end, a rear end, and a prime mover operable to move the vehicle. The roll over protection system includes a first upright portion including a first end connected to the vehicle left side and a second end spaced from the vehicle left side. The first upright portion defines a first aperture near the second end. A second upright portion includes a first end connected to the vehicle right side and a second end spaced from the vehicle right side. The second upright portion defines a second aperture proximate the second end. A third upright portion includes a first end having a first borehole and being connected for rotation with respect to the second end of the first upright portion and a second end having a second borehole and being connected for rotation with respect to the second portion. A first pin extends through the first aperture of the first upright portion and the first borehole of the third upright portion. The first pin defines a first pin diameter. A second pin extends through the second aperture of the second upright portion and the second borehole of the third upright portion. The second pin defines a second pin diameter. A first bushing is positioned in the first borehole of the third upright portion. The first bushing has a first inner diameter and a second inner diameter in which the first inner diameter is greater than the second inner diameter. The first inner diameter is greater than the first pin diameter and the second inner diameter is less than or equal to the first pin diameter. A second bushing extends through the second borehole of the third upright portion. The second bushing has a first inner diameter and a second inner diameter. The first inner diameter is greater than the second inner diameter, the first inner diameter is greater than the second pin diameter and the second inner diameter is less than or equal to the second pin diameter.

In some embodiments, the disclosure provides a vehicle including a frame having a left side, a right side, a front end and a rear end, a prime mover operable to move the vehicle, and a roll over protection system. The roll over protection includes a first upright portion having a first end connected to the vehicle left side and a second end spaced from the vehicle left side. The first upright portion defines a first aperture near the second end. A second upright portion has a first end connected to the vehicle right side and a second end spaced from the vehicle right side. The second upright portion defines a second aperture near the second end. A third upright portion has a first end having a first borehole and being connected for rotation with respect to the second end of the first upright portion and a second end having a second borehole and being connected for rotation with respect to the second portion. A first pin extends through the first aperture of the first upright portion and the first borehole of the third upright portion. The first pin defines a first pin diameter. A second pin extends through the second aperture of the second upright portion and the second borehole of the third upright portion. The second pin defines a second pin diameter. A first bushing is positioned in the first borehole of the third upright portion. The first bushing has a first inner diameter and a second inner diameter in which the first inner diameter is greater than the second inner diameter. The first inner diameter is greater than the first pin diameter, and the second inner diameter being less than or equal to the first pin diameter. A second bushing is positioned in the second borehole of the third upright portion and the second bushing has a first inner diameter and a second inner diameter in which the first inner diameter is greater than the second inner diameter. The first inner diameter is greater than the second pin diameter and the second inner diameter is less than or equal to the second pin diameter.

In some embodiments the disclosure provides an upright for a roll over protection system for a vehicle. The upright includes a first end defining a first borehole and the first end can be connected to a first portion of the vehicle. A second end defines a second borehole and the second end can be connected to a second portion of the vehicle. A first bushing can be inserted into the first borehole. The first bushing has a first inner diameter and a second inner diameter in which the first inner diameter is greater than the second inner diameter. A first pin can extend through the first bushing and defines a first pin diameter. A second bushing can be inserted into the second borehole and has a first inner diameter and a second inner diameter in which the first inner diameter is greater than the second inner diameter. A second pin can extend through the second bushing. The first inner diameter of the first bushing is greater than the first pin diameter and the second inner diameter of the first bushing is less than or equal to the first pin diameter. The first inner diameter of the second bushing is greater than the second pin diameter and the second inner diameter of the second bushing is less than or equal to the second pin diameter.

Other aspects of the disclosure will become apparent by consideration of the detailed description and accompanying drawings.

DETAILED DESCRIPTION

Before any embodiments of the roll over protection system are explained in detail, it is to be understood that the roll over protection system is not limited in its application to the details of construction and the arrangement of components set forth in the following description or illustrated in the following drawings. The roll over protection system is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the roll over protection system, and do not alone indicate or imply that the device or element referred to must have a particular orientation. In addition, terms such as "first" and "second" are used herein for purposes of description and are not intended to indicate or imply relative importance or significance.

Figure 1:
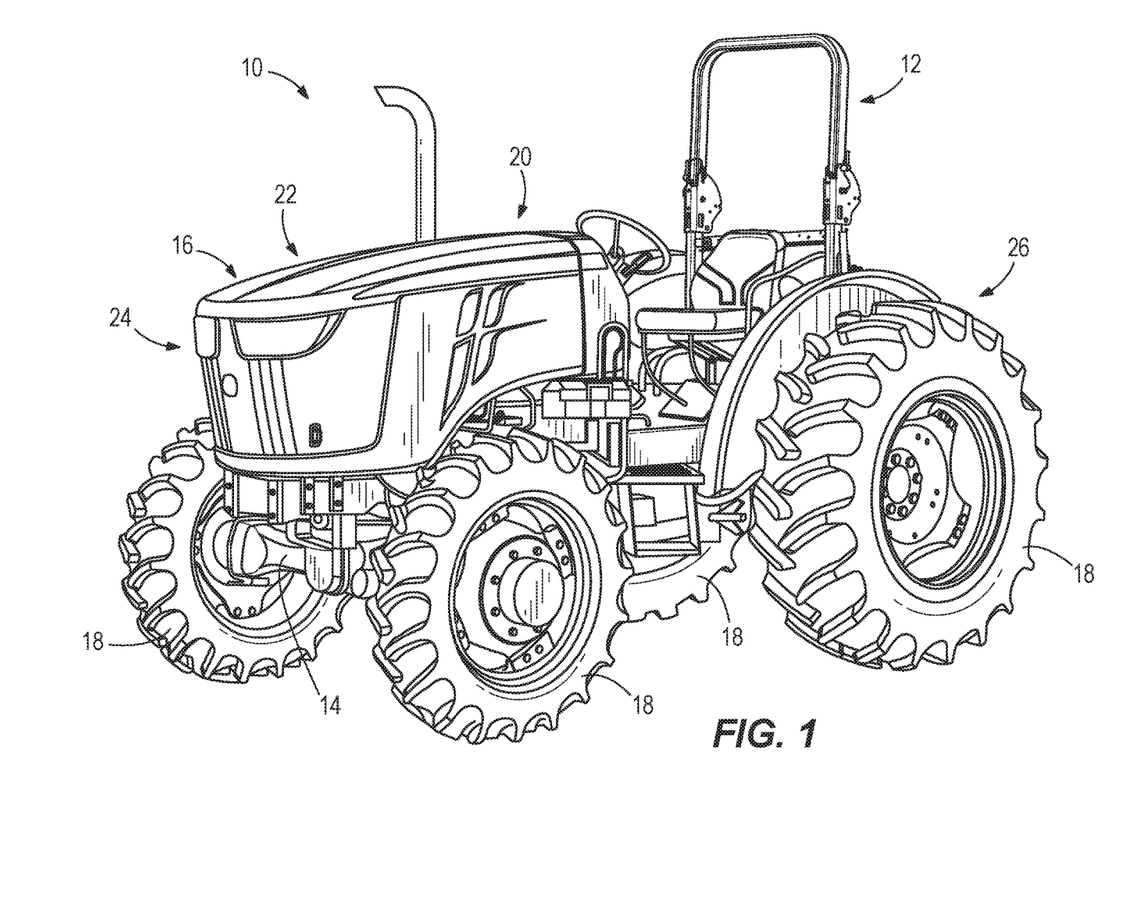
FIG. 1 is a front perspective view of a vehicle with a roll over protection system in an upright position according to some embodiments.

FIG. 1 illustrates one possible embodiment of a vehicle 10 with a roll over protection system 12. The illustrated vehicle 10 includes a frame 14, a prime mover 16 and a plurality of wheels 18. The illustrated vehicle 10 defines a left side 20, a right side 22, a front end 24 and a rear end 26 oriented with respect to an operator positioned on the tractor. The prime mover 16 is operable to move the vehicle 10 on the plurality of wheels 18. While the illustrated vehicle 10 is a tractor, the roll over protection system 12 can be attached to any suitable vehicle.

Figure 2:
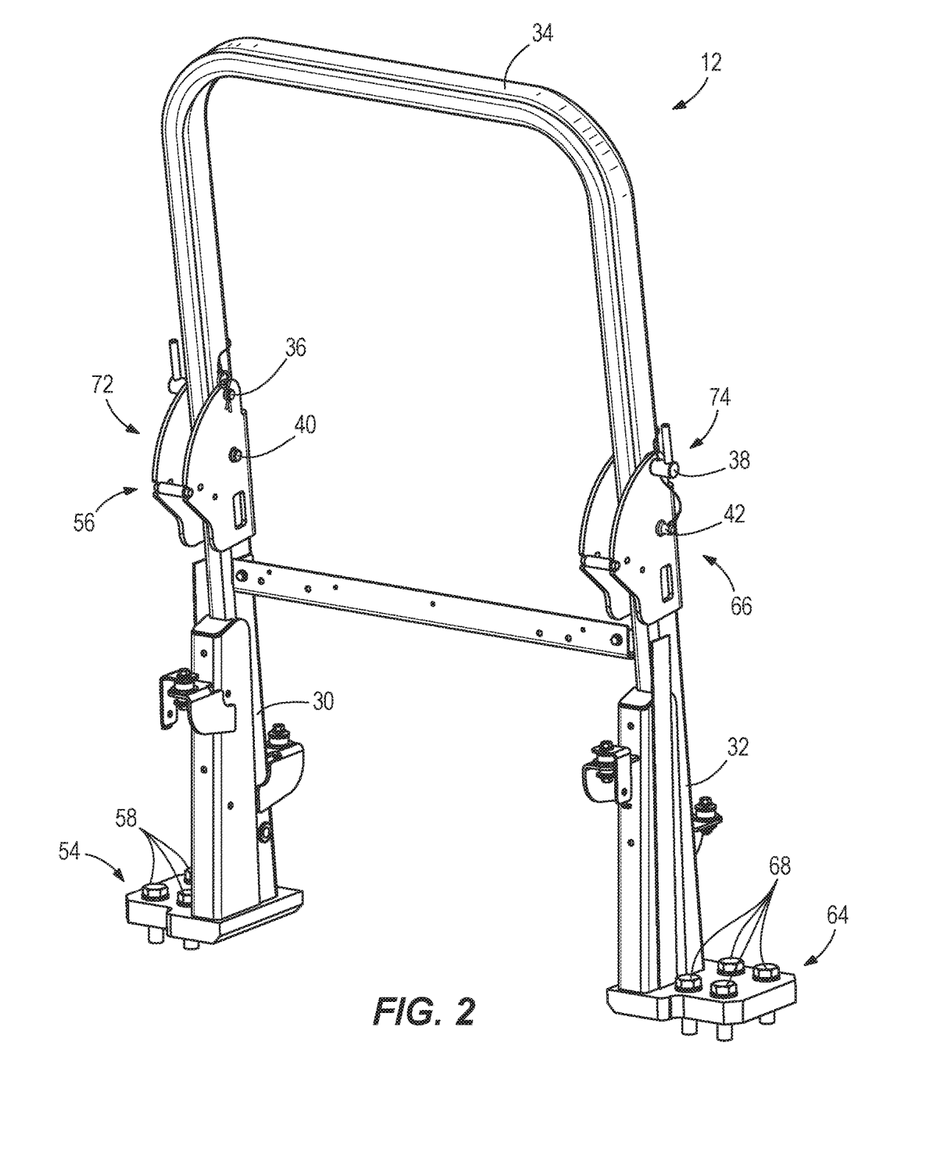
FIG. 2 is a rear perspective view of the roll over protection system of FIG. 1.
Figure 3:
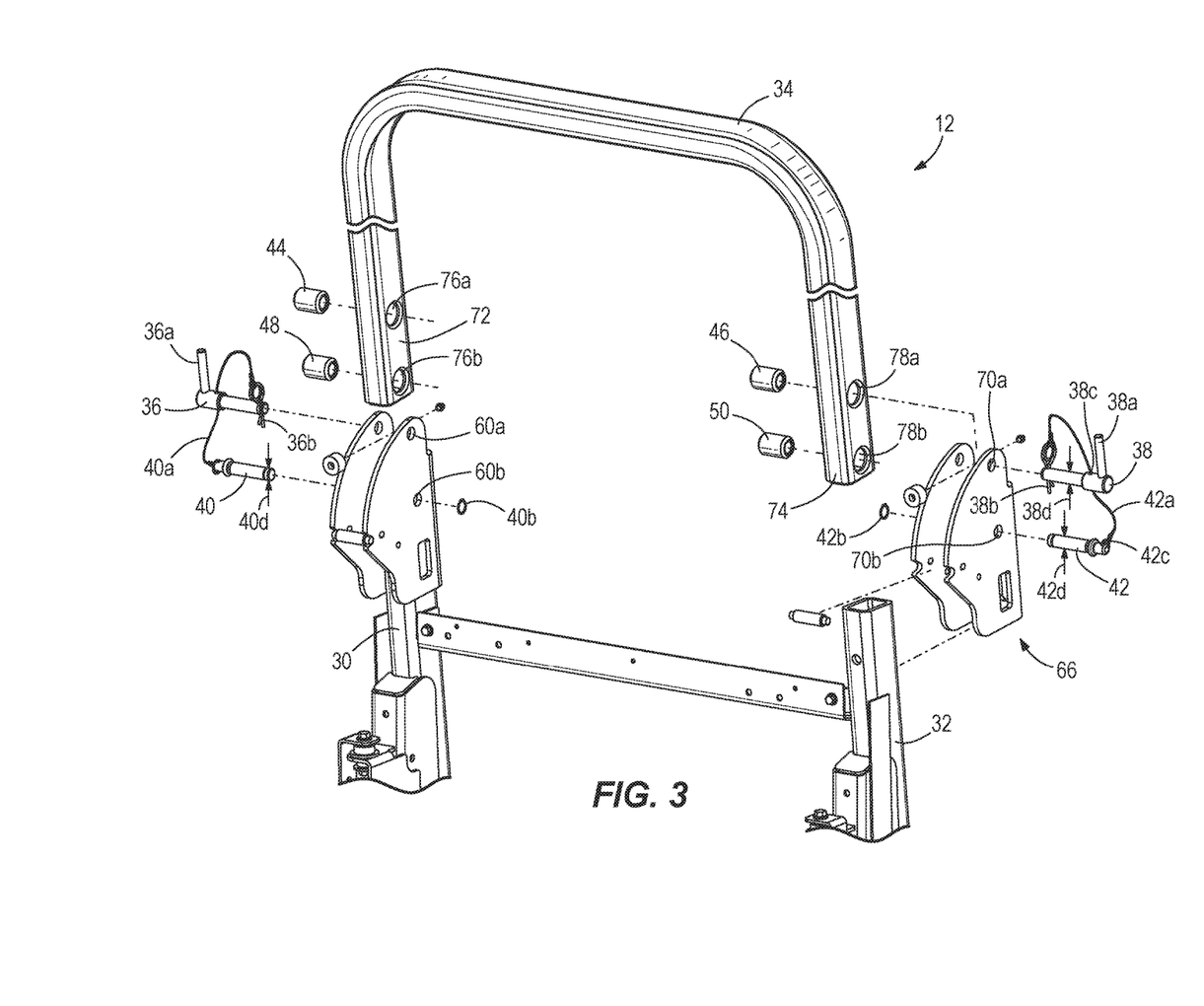
FIG. 3 is an exploded view of the roll over protection system of FIGS. 1 and 2.

As shown in FIGS. 2 and 3, the roll over protection system 12 includes a first upright portion 30, a second upright portion 32, a third upright portion 34, first, second, third and fourth pins 36, 38, 40 and 42, respectively, and first, second, third and fourth bushings 44, 46, 48 and 50, respectively.

The first upright portion 30 has a first end 54 and a second end 56 spaced from the first end 54. The first end 54 is coupled to the left side 20 of the vehicle 10 by a plurality of fasteners 58. The illustrated fasteners 58 are nuts and bolts, but other suitable fasteners can be utilized to connect the first end 54 of the first upright portion 30 to the left side 20 of the vehicle 10. The illustrated second end 56 includes a bracket that defines a first aperture 60a and a third aperture 60b extending therethrough. In some embodiments, the bracket is affixed to the elongate portion (e.g., by welding) such that the bracket is part of the first upright portion 30. In other embodiments, the bracket can be a separate component.

The second upright portion 32 has a first end 64 and a second end 66 spaced from the first end 64. The first end 64 is coupled to the right side 22 of the vehicle 10 by a plurality of fasteners 68. The illustrated fasteners 68 are nuts and bolts, but other suitable fasteners can be utilized to connect the first end 64 of the second upright portion 32 to the right side 22 of the vehicle 10. The illustrated second end 66 includes a bracket that defines a second aperture 70a and a fourth aperture 70b extending therethrough. In some embodiments, the bracket is affixed to the elongate portion (e.g., by welding) such that the bracket is part of the second upright portion 32. In other embodiments, the bracket can be a separate component.

The third upright portion 34 has a first end 72 and a second end 74 spaced from the first end 72. The illustrated first end 72 defines a first borehole 76a and a third borehole 76b extending therethrough. The illustrated second end 74 defines a second borehole 78a and a fourth borehole 78b extending therethrough. The first end 72 of the third upright portion 34 is connected to the second end 56 of the first upright portion 30 and the second end 74 of the third upright portion 34 is connected to the second end 66 of the second upright portion 32.

As shown in FIGS. 3-6, the illustrated first pin 36 extends into the first aperture 60a of the first upright portion 30 and the first borehole 76a of the third upright portion 34. The illustrated first pin 36 includes a first end having a handle 36a and a second end having a retaining pin 36b. The illustrated first pin 36 defines an opening 36c extending substantially perpendicular to the axial length of the first pin 36. The first pin 36 defines a first pin diameter 36d that is constant over a portion of the length of the first pin 36.

With specific reference to FIG. 3, the illustrated second pin 38 is a mirror image of the first pin 36 and extends into the second aperture 70a of the second upright portion 32 and the second borehole 78a of the third upright portion 34. The illustrated second pin 38 includes a first end having a handle 38a and a second end having a retaining pin 38b. The illustrated second pin 38 defines an opening 38c extending substantially perpendicular to the axial length of the second pin 38. The second pin 38 defines a second pin diameter 38d that is constant over a portion of the length of the second pin 40.

Figure 4:
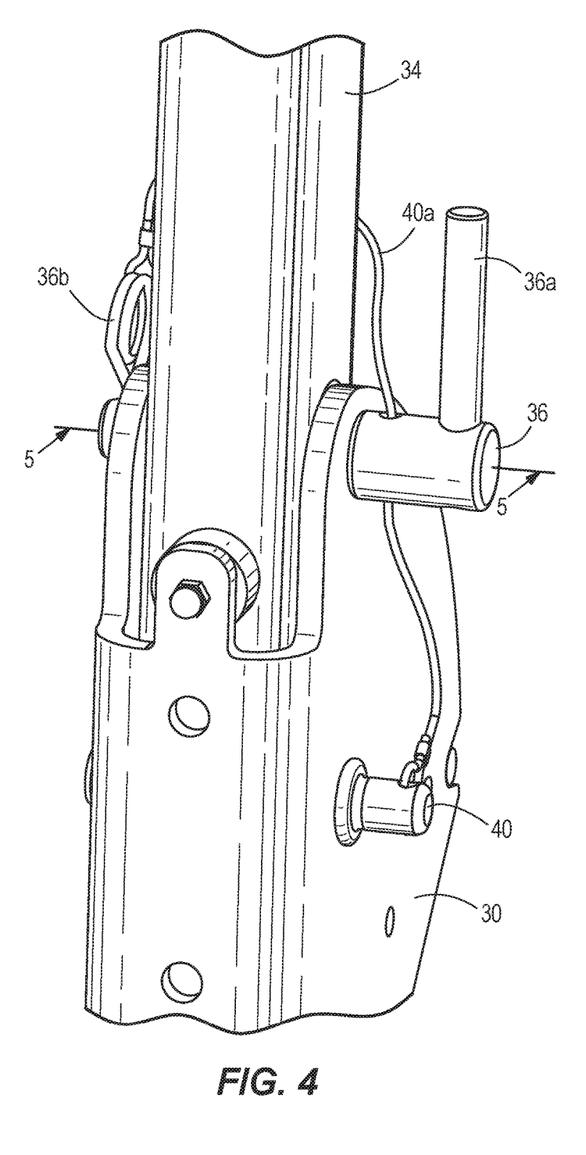
FIG. 4 is a close-up view of a portion of the roll over protection system of FIGS. 1-3.
Figure 5:
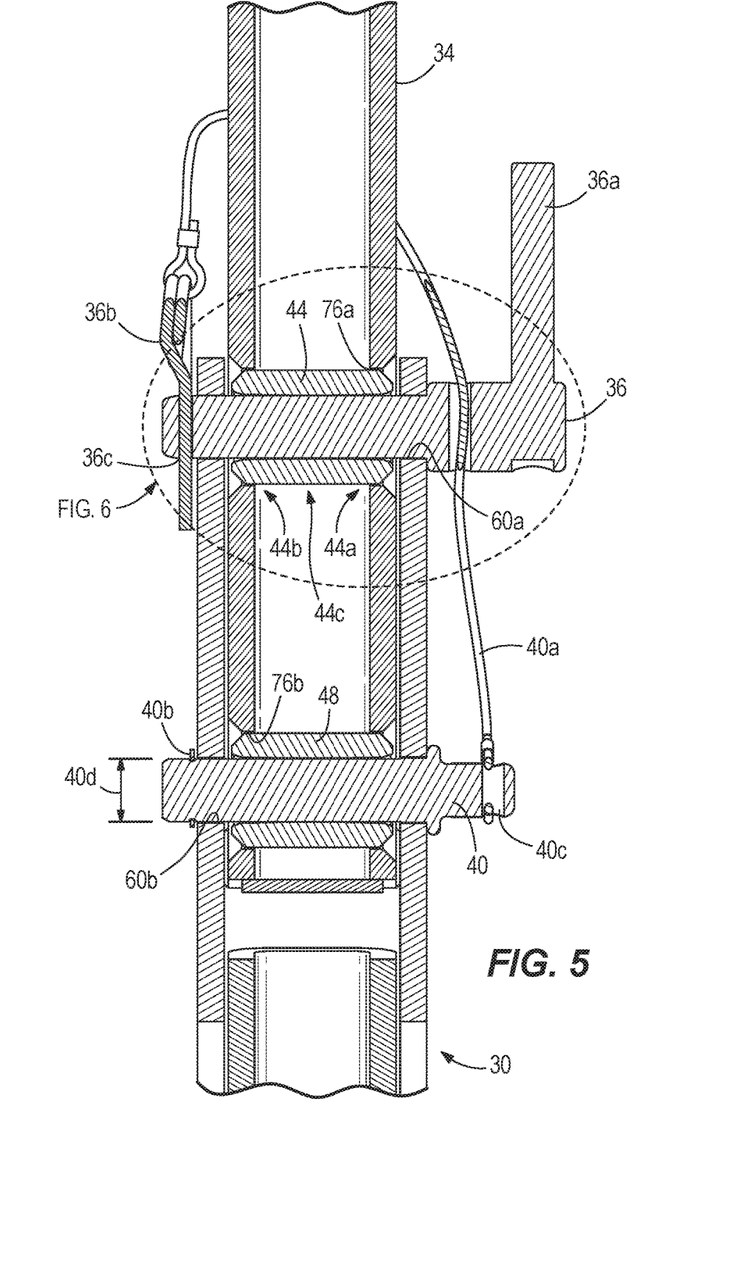
FIG. 5 is a cross-sectional view of a portion of the roll over protection system taken along line 5-5 of FIG. 4.

As shown in FIGS. 3-5, the illustrated third pin 40 extends into the third aperture 60b of the first upright portion 30 and the third borehole 76b of the third upright portion 34. The illustrated third pin 40 includes a first end having a cable 40a connected to the retaining pin 36a of the first pin 36 and a second end having a snap ring 40b. The illustrated third pin 40 defines an opening 40c extending substantially perpendicular to the axial length of the third pin 40. The third pin 40 defines a third pin diameter 40d that is constant over a portion of the length of the third pin 38.

The illustrated fourth pin 42 is a mirror image of the third pin 40 and extends into the fourth aperture 70b of the second upright portion 32 and the fourth borehole 78b of the third upright portion 34. The illustrated fourth pin 42 includes a first end having a cable 42a connected to the retaining pin 38b of the second pin 38 and a second end having a snap ring 42b. The illustrated fourth pin 42 defines an opening 42c extending substantially perpendicular to the axial length of the fourth pin 42. The fourth pin 42 defines a fourth pin diameter 42d that is constant over a portion of the length of the fourth pin 42.

Figure 6:
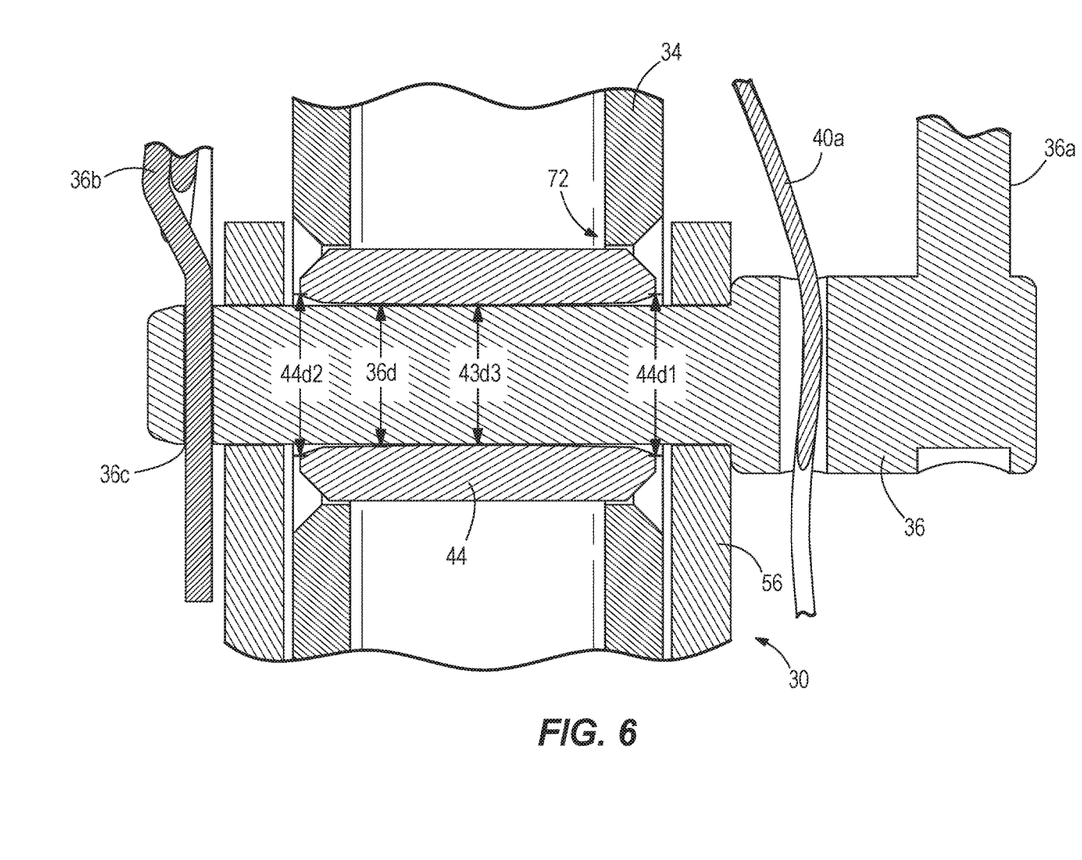
FIG. 6 is a close-up cross-sectional view of a portion of the roll over protection system of FIG. 5.

With reference to FIGS. 5 and 6, the first bushing 44 is positioned in the first borehole 76a of the third upright portion 34. The first bushing 44 includes a first end 44a, a second end 44b and a middle portion 44c. The first end 44a of the first bushing 44 defines a first inner diameter 44d1, the second end 44b of the first bushing 44 defines a second inner diameter 44d2 and the middle portion 44c of the first bushing 44 defines a third inner diameter 44d3. In the illustrated embodiment, the first diameter 44d1 is equal to the second diameter 44d2 and the third diameter 44d3 is less than the first diameter 44d1 and less than the second diameter 44d2. The first pin diameter 36d is less than the first inner diameter 44d1 and less than the second inner diameter 44*d*2. The illustrated first bushing 44 is tapered between the first diameter 44*d*1 and the third diameter 44*d*3 and between the third diameter 44*d*3 and the second diameter 44*d*2. The illustrated first bushing 44 is a double taper bushing, but other bushings with differing diameters along the length are within the scope of the present application.

The first pin diameter 36*d* is greater than or equal to the third inner diameter 44*d*3. Therefore, when the first pin 36 is inserted into the first bushing 44, the first pin 36 contacts the middle portion 44*c* of the first bushing 44 and is spaced from the first end 44*a* and the second end 44*b* of the first bushing 44. When the first pin 36 is inserted into the first bushing 44, the first pin 36 contacts the second end 56 of the first upright portion 30 and is spaced from the first end 72 of the third upright portion 34.

While the illustrated first bushing 44 is shown in great detail, the illustrated second, third and fourth bushings 46, 48 and 50 are identical to the illustrated first bushing 44. Specifically, the second, third and fourth bushings 46, 48 and 50 each include third inner diameters that are smaller than inner diameters at first and second ends. Further, the third diameters of the second, third and fourth bushings 46, 48 and 50 are less than or equal to the respective pin diameters 38*d*, 40*d* and 42*d*. The diameters at the first and second ends of the second, third and fourth bushings 46, 48 and 50 are greater than the respective pin diameters 38*d*, 40*d* and 42*d*. The illustrated second, third and fourth bushings 46, 48 and 50 are double taper bushings, but other bushings with differing diameters along the length are within the scope of the present application.

Figure 7:
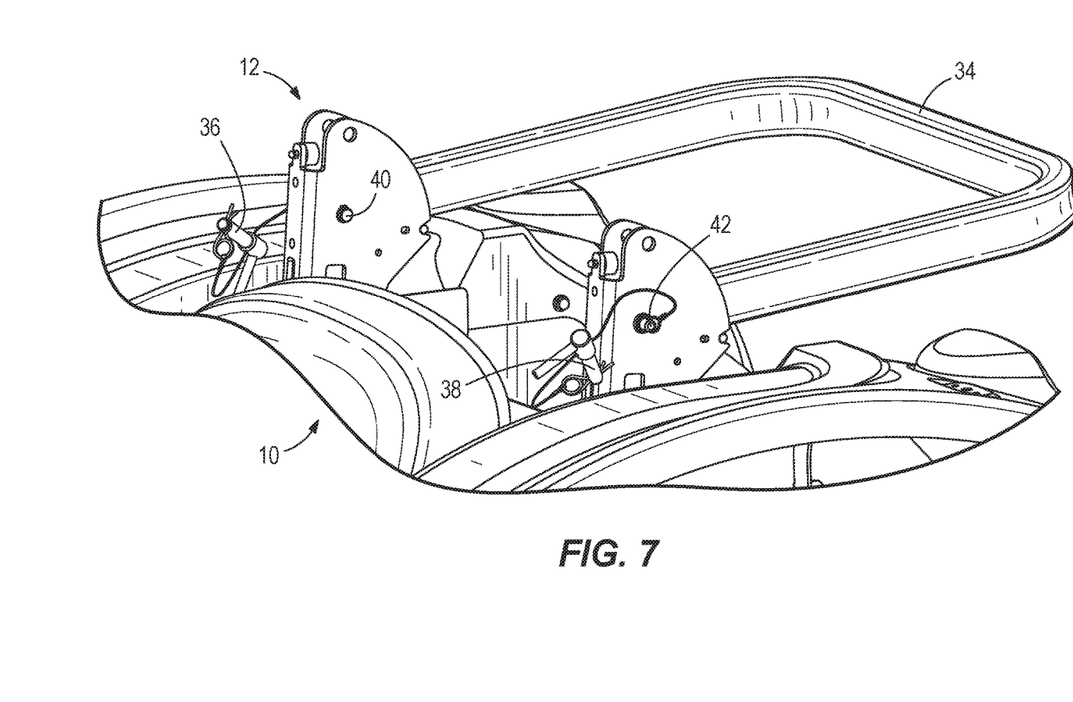
FIG. 7 is a perspective view of the roll over protection system in a stowed position.

In operation, the roll over protection system 12 is in the operational position as illustrated in FIG. 1. When an operator desires to lower the roll over protection system to the stowed position shown in FIG. 7, the operator removes the retaining pin 36*b* from the first pin 36 and slides the first pin 36 out of the first bushing 44. The first pin 36 is suspended from the third pin 40 by the cable 40*a* such that the first pin 36 remains connected to the roll over protection system 12 even when removed from the first bushing 44. The operator then removes the retaining pin 38*b* from the second pin 38 and slides the second pin 38 out of the second bushing 46. The second pin 38 is suspended from the fourth pin 42 by the cable 42*a* such that the second pin 38 remains connected to the roll over protection system 12 even when removed from the second bushing 46. When the first and second pins 36, 38 are removed from the respective bushings 44, 46, the third upright portion 34 is pivotable with respect to the first and second upright portions 30, 32 about the third and fourth pins 40, 42. The third upright portion 34 is pivoted from the operational position of FIG. 1 into the stowed position shown in FIG. 7.

When the operator desires to raise the roll over protection system into the operational position, the operator rotates the third upright portion 34 such that the first borehole 76*a* and first bushing 44 are substantially aligned with the first aperture 60*a* of the first upright portion 30 and such that the second borehole 78*a* and the second bushing 46 are substantially aligned with the second aperture 70*a* in the second upright portion 32. Then, the operator inserts the first pin 36 into the first bushing 44 and inserts the retaining pin 36*b* into the opening 36*c* of the first pin 36. Also, the operator inserts the second pin 38 into the second bushing 46 and inserts the retaining pin 38*b* into an opening of the second pin 38. The opening of the second pin 38 substantially corresponds to the opening 36*c* of the first pin 36.

When the pins 36, 38, 40, 42 are all installed as shown in FIG. 1, each of the pins 36, 38, 40, 42 includes three points of contact with the uprights 30, 32, 34. Specifically, the first pin 36 contacts the first upright potion 30 at two locations (left and right in FIGS. 5, 6) and contacts the first bushing 44 in one location because of the double taper shape of the first bushing 44. Previously, the pin would have four points of contact (two with the first upright portion and two with the third upright portion). Similarly, the other pins 38, 40, 42 each have three points of contact: two with the respective upright portion 30, 32 and one with the respective bushing 46, 48, 50. Reducing the points of contact from four to three per pin allows tighter tolerances to be used and decreases any rattling between the upright portions 30, 32, 34.

Various features and advantages of the disclosure are set forth in the following claims.

What is claimed is:

1. A roll over protection system for a vehicle having a frame, a left side, a right side, a front end, a rear end, and a prime mover operable to move the vehicle, the roll over protection system comprising:
    a first upright portion including a first end coupled to the vehicle left side and a second end spaced from the vehicle left side, the first upright portion defining a first aperture proximate the second end;
    a second upright portion including a first end coupled to the vehicle right side and a second end spaced from the vehicle right side, the second upright portion defining a second aperture proximate the second end;
    a third upright portion including a first end having a first borehole and being pivotably coupled to the second end of the first upright portion and a second end having a second borehole and being pivotably coupled to the second end of the second upright portion;
    a first pin extending through the first aperture of the first upright portion and the first borehole of the third upright portion, the first pin defining a first pin diameter;
    a second pin extending through the second aperture of the second upright portion and the second borehole of the third upright portion, the second pin defining a second pin diameter;
    a first bushing positioned in the first borehole of the third upright portion, the first bushing having a first inner diameter and a second inner diameter, the first inner diameter being greater than the second inner diameter, the first inner diameter being greater than the first pin diameter and the second inner diameter being less than or equal to the first pin diameter; and
    a second bushing positioned in the second borehole of the third upright portion, the second bushing having a first inner diameter and a second inner diameter, the first inner diameter being greater than the second inner diameter, the first inner diameter being greater than the second pin diameter and the second inner diameter being less than or equal to the second pin diameter.

2. The roll over protection system of claim 1, wherein an inside surface of the first bushing is tapered between the first inner diameter and the second inner diameter.

3. The roll over protection system of claim 1, wherein the first bushing further comprises a third inner diameter substantially equal to the first inner diameter, the second inner diameter positioned between the first inner diameter and the third inner diameter.

4. The roll over protection system of claim 3, wherein an inside surface of the first bushing is tapered between the first inner diameter and the second inner diameter.

5. The roll over protection system of claim 4, wherein the inside surface of the first bushing is tapered between the second inner diameter and the third inner diameter.

6. A vehicle comprising:
a frame having a left side, a right side, a front end and a rear end;
a prime mover operable to move the vehicle; and
a roll over protection system including
a first upright portion including a first end coupled to the vehicle left side and a second end spaced from the vehicle left side, the first upright portion defining a first aperture proximate the second end;
a second upright portion including a first end coupled to the vehicle right side and a second end spaced from the vehicle right side, the second upright portion defining a second aperture proximate the second end;
a third upright portion including a first end having a first borehole and being pivotably coupled to the second end of the first upright portion and a second end having a second borehole and being pivotably coupled to the second end of the second upright portion;
a first pin extending through the first aperture of the first upright portion and the first borehole of the third upright portion, the first pin defining a first pin diameter;
a second pin extending through the second aperture of the second upright portion and the second borehole of the third upright portion, the second pin defining a second pin diameter;
a first bushing positioned in the first borehole of the third upright portion, the first bushing having a first inner diameter and a second inner diameter, the first inner diameter being greater than the second inner diameter, the first inner diameter being greater than the first pin diameter and the second inner diameter being less than or equal to the first pin diameter; and
a second bushing positioned in the second borehole of the third upright portion, the second bushing having a first inner diameter and a second inner diameter, the first inner diameter being greater than the second inner diameter, the first inner diameter being greater than the second pin diameter and the second inner diameter being less than or equal to the second pin diameter.

7. The vehicle of claim 6, wherein an inside surface of the first bushing is tapered between the first inner diameter and the second inner diameter.

8. The vehicle of claim 6, wherein the first bushing further comprises a third inner diameter substantially equal to the first inner diameter, the second inner diameter positioned between the first inner diameter and the third inner diameter.

9. The vehicle of claim 8, wherein an inside surface of the first bushing is tapered between the first inner diameter and the second inner diameter.

10. The vehicle of claim 9, wherein the inside surface of the first bushing is tapered between the second inner diameter and the third inner diameter.

11. The vehicle of claim 6, further comprising a third bushing and a third pin,
wherein the first upright portion defines a third aperture proximate the first aperture,
wherein the third upright portion defines a third borehole proximate the first borehole,
wherein the third bushing is configured to be received in the third borehole and
wherein the third pin is configured to be received in the third bushing and the third aperture.

12. The vehicle of claim 11, wherein the third bushing has a tapered inner surface such than an third pin contacts the third bushing along an axial length that is shorter that the axial length of the third pin.

13. The vehicle of claim 11, further comprising a fourth bushing and a fourth pin,
wherein the second upright portion defines a fourth aperture proximate the second aperture,
wherein the third upright portion defines a fourth borehole proximate the second borehole,
wherein the fourth bushing is configured to be received in the fourth borehole and
wherein the fourth pin is configured to be received in the fourth bushing and the fourth aperture.

14. The vehicle of claim 13, wherein the fourth bushing has a tapered inner surface such than an fourth pin contacts the fourth bushing along an axial length that is shorter that the axial length of the fourth pin.

15. An upright for a roll over protection system for a vehicle, the upright comprising:
a first end defining a first borehole, the first end configured to be connected to a first portion of the vehicle;
a second end defining a second borehole, the second end configured to be connected to a second portion of the vehicle;
a first bushing configured to be inserted into the first borehole, the first bushing having a first inner diameter and a second inner diameter, the first inner diameter being greater than the second inner diameter;
a first pin configured to extend through the first bushing, the first pin defining a first pin diameter;
a second bushing configured to be inserted into the second borehole, the second bushing having a first inner diameter and a second inner diameter, the first inner diameter being greater than the second inner diameter; and
a second pin configured to extend through the second bushing, the second pin defining a second pin diameter;
wherein the first inner diameter of the first bushing is greater than the first pin diameter and the second inner diameter of the first bushing is less than or equal to the first pin diameter, and
wherein the first inner diameter of the second bushing is greater than the second pin diameter and the second inner diameter of the second bushing is less than or equal to the second pin diameter.

16. The upright of claim 15, further comprising a third pin and a third bushing,
wherein the first end further defines a third borehole sized to receive the third bushing and the third pin.

17. The upright of claim 16, wherein the third bushing has a tapered inner surface such than an third pin contacts the third bushing along an axial length that is shorter that the axial length of the third pin.

18. The upright of claim 16, further comprising a fourth pin and a fourth bushing,
wherein the second end further defines a fourth borehole sized to receive the fourth bushing and the fourth pin.

19. The upright of claim 18, wherein the fourth bushing has a tapered inner surface such than an fourth pin contacts the fourth bushing along an axial length that is shorter that the axial length of the fourth pin.

* * * * *